United States Patent [19]

Masetti

[11] 4,090,918

[45] May 23, 1978

[54] SPACER STRUCTURE

[75] Inventor: William R. Masetti, White Plains, N.Y.

[73] Assignee: General Atomic Company, San Diego, Calif.

[21] Appl. No.: 730,974

[22] Filed: Oct. 8, 1976

Related U.S. Application Data

[63] Continuation of Ser. No. 557,812, Mar. 12, 1975, abandoned.

[51] Int. Cl.² .............................................. G21C 3/30
[52] U.S. Cl. ........................................ 176/78; 211/14
[58] Field of Search ................. 176/76, 78, 81; 211/14

[56] References Cited

U.S. PATENT DOCUMENTS

| | | | |
|---|---|---|---|
| 375,363 | 12/1887 | Krum | 217/31 |
| 682,646 | 9/1901 | Scheuer | 217/31 |
| 2,346,025 | 4/1944 | Guszmann | 217/31 |
| 2,854,724 | 10/1958 | Wuorio | 217/31 |
| 3,068,163 | 12/1962 | Currier, Jr. et al. | 176/78 |
| 3,679,547 | 7/1972 | Warberg | 176/76 X |
| 3,715,275 | 2/1973 | Krawiec | 176/76 X |
| 3,813,288 | 5/1974 | Leaver et al. | 176/78 |
| 3,833,471 | 9/1974 | Chetter | 176/78 |
| 3,844,887 | 10/1974 | Georges et al. | 176/76 X |
| 3,889,438 | 6/1975 | Piepers et al. | 176/78 X |

FOREIGN PATENT DOCUMENTS

| | | | |
|---|---|---|---|
| 1,297,471 | 10/1961 | France | 176/78 |

Primary Examiner—Peter A. Nelson
Attorney, Agent, or Firm—Fitch, Even, Tabin & Luedeka

[57] ABSTRACT

A spacer structure is described for maintaining a spaced relation between a plurality of generally parallel fuel rods within a housing in a nuclear reactor. The spacer structure is comprised of a grid pattern of ribs slotted to interlock with each other. The slots are arranged in such a way that when the ribs are welded to each other, the weld shrinkage is distributed uniformly in all directions to reduce or eliminate the amount of rework necessary in manufacturing the spacer structure.

6 Claims, 4 Drawing Figures

SPACER STRUCTURE

This is a continuation, of application Ser. No. 557,812, filed Mar. 12, 1975 and now abandoned.

This invention relates generally to nuclear reactors and, more particularly, to a spacer structure for maintaining a spaced relation between a plurality of generally parallel fuel rods in a nuclear reactor.

In nuclear reactors of the type which employ elongated fuel rods in the reactor core, provision is typically made for maintaining the relative location and alignment of the fuel rods. Typically, such provision is made by means of a spacer structure comprised of elements integral with or separated from the fuel rods and which may form a grid-like structure. Buttons or other suitable protuberances on the spacer structure engage the outer surfaces of the fuel rods to maintain a desired separation. Such a spacer structure may by supported by suitable structure to extend transversely of the entire reactor core, or may extend transversely of a modular core fuel element comprising an outer housing or other support structure containing a plurality of fuel rods.

A convenient structural design for spacer structures of the type described incorporates a plurality of ribs arranged to form a grid or egg crate arrangement. The ribs are provided with buttons or other suitable protuberances which engage the fuel rods and maintain the spacing therebetween, with each fuel rod passing through a cell defined by the ribs. In one useful design, the ribs are slotted and interlock at the slots, with stability being provided by welding the ribs together at the slots.

Typical prior art spacer structures of the type described usually require a considerable amount of rework. This is required as a result of differential weld shrinkages occurring due to the arrangement of the interlocking or mating slots. For example, where the slots of the ribs extending in the "X" direction all extend from the top edge of the ribs, and where the slots of the ribs extending in the "Y" direction therefore necessarily extend from the bottom edge thereof, top edge shrinkage is in the "X" direction while bottom edge shrinkage is in the "Y" direction. The resultant spacer structure tends to assume a saddle shape having ribs in a fan-like pattern. Much rework is therefore necessary to bring the spacer structures into acceptable tolerances.

It is an object of the present invention to provide an improved spacer structure for maintaining a spaced relation between a plurality of generally parallel fuel rods within a housing in a nuclear reactor.

Another object of the invention is to provide a spacer structure of the type described suitable for welded construction in which the amount of rework required during manufacture to bring the spacer structure into acceptable tolerances is minimized.

Another object of the invention is to provide a spacer structure of the type described in which weld shrinkage is distributed uniformly in all directions.

Other objects of the invention will become apparent to those skilled in the art from the following description, taken in connection with the accompanying drawings wherein.

Figure 1:
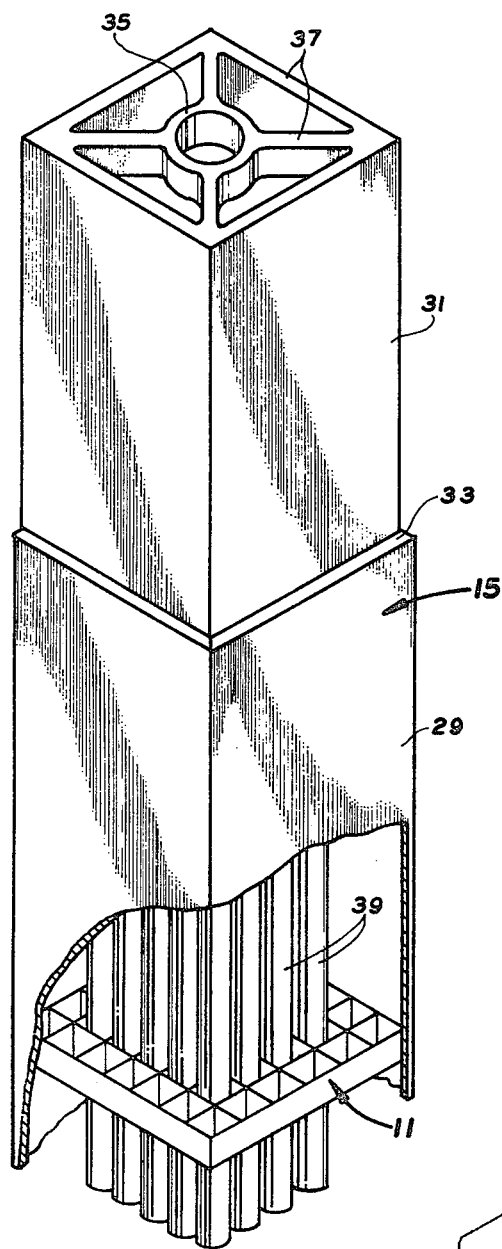
FIG. 1 is a perspective view, with part broken away, illustrating a nuclear reactor fuel element incorporating the spacer structure of the invention.

Very generally, the spacer structure 11 of the invention includes a plurality of first ribs 13 which extend substantially parallel with each other across the interior of a support structure 15. The first ribs each have a plurality of slots 17 and 18 therein extending from opposite longitudinal edges 19 and 21 thereof, respectively. The slots 17 and 18 are substantially parallel with each other and are spaced longitudinally along the ribs extending in sequence from alternate edges 19 and 21. A plurality of second ribs 23 extend substantially parallel with each other across the interior of the support structure transversely of the first ribs. The second ribs each have a plurality of slots 25 therein extending from one longitudinal edge 27 thereof. The second ribs are oriented to alternate the position of their slotted edges 27 to mate in the slots 17 and 18 in the first ribs on both longitudinal edges thereof. The ribs are welded to each other at the mated slots.

Referring now particularly to FIG. 1, a modular fuel element is shown. A plurality of such fuel elements may be positioned adjacent each other to form the reactive core for a nuclear reactor. The specific spacer structure 11 which is described herein is for use in a modular fuel element of the illustrated type. It is to be understood, however, that the spacer structure of the invention is also applicable in situations other than that illustrated, such as, for example, in situations wherein a core is comprised of a plurality of mutually parallel fuel rods in a non-modular arrangement.

The modular fuel element includes a support structure 15 comprising a box-like housing 29 which is shaped to enclose a rectangular cross section. The upper end of the housing is provided with a section 31 of reduced size forming a shoulder 33 surrounding the periphery of the housing. The reduced size section 31 mates in a correspondingly shaped recess in a supporting structure (not shown) such that the illustrated fuel element and the other similar fuel elements depend from the supporting structure and are held in proper relative alignment. The fuel element is secured in a grid support, not shown, by suitable securing means 35 supported at the top end of the fuel element housing by diagonally extending webs 37. The securing means 35 may, for example, be designed to provide a bayonet type attachment to the grid support so that the modular fuel element may be readily released and lowered from the grid support for replacement.

Inside of the housing 15 of the fuel element, provision is made (not shown) for suspsending a plurality of fuel rods 39 from their upper ends to depend downwardly and along the elongated fuel element. The fuel rods may be of any suitable construction, such as pelletized fissionable material contained within a suitable metallic cladding. The illustrated fuel rods are cylindrical and are arranged within the housing on a rectangular cross-sectional pitch.

Figure 2:
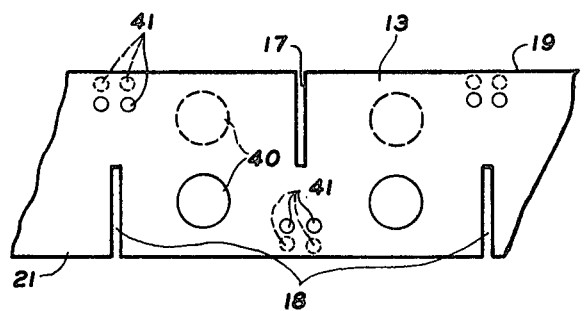
FIG. 2 is a plan view illustrating one type of rib configuration used in the invention.

In order to maintain a desired spaced relation between the fuel rods 39, a spacer structure 11 constructed in accordance with the invention is provided at at least one location spaced along the length of the fuel rods from their supported upper ends. The spacer structure 11 is comprised of intersecting ribs 13 and 23 which extend across the interior of the housing 15 and are suitably secured, by means not shown, to the walls of the housing. The ribs may be fabricated out of sheet stock by stamping or other suitable means and the ribs may be provided with integral buttons 40, shown in FIGS. 2-4, at appropriate locations for engaging the fuel rods 39. By this expedient, the contact area between the locating ribs and the fuel rods is minimized to maximize the amount of surface area of the rods exposed to the flow of reactor coolant for heating the coolant. The reactor coolant flows longitudinally within the housing 15 along the outer surface of the fuel rods.

In the spacer structure 11 of the invention, all of the ribs 13 extend parallel with each other in what may be termed the "X" direction, with the remaining ribs 23 extending parallel to each other transversely of the ribs 13. This may be termed the "Y" direction where, as in the illustrated embodiment, the ribs 23 are perpendicular to the ribs 13. The ribs are designed to interlock as they cross by mating slots. The ribs are then joined to each at the slots by welding.

In the spacer structure of the invention, the ribs 13 are provided with a plurality of slots 17 extending from one edge 19 about half-way across the ribs. Another series of slots 18 is provided for the opposite edge 21 extending about half-way across the rib. The slots 18 are aligned in the transverse direction about midway between the slots 17 with the slots 17 and 18 being all parallel with each other. Thus, the longitudinal spacing of the slots along the ribs provides a sequence such that the slots extend from the alternate edges 19 and 21. In the illustrated embodiment, the sequence is such that every other slot extends from the same edge, but it may be possible within the scope of the present invention to utilize another sequence depending upon particular structural details. It is preferable, however, that the number of slots extending from the respective edges be substantially equal.

The ribs 23 which extend perpendicular to the ribs 13 are provided with a plurality of slots 25 which extend from only one of the longitudinal edges 27 of the rib 23. This configuration may be seen in FIG. 3.

Figure 4:
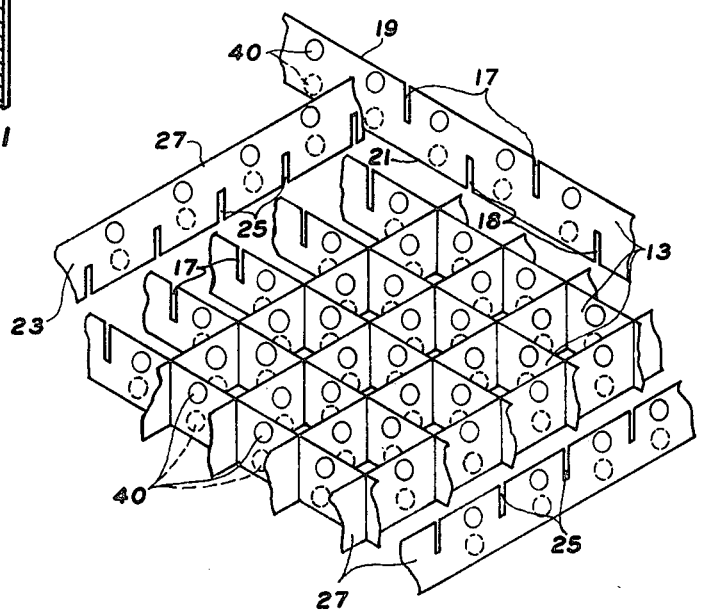
FIG. 4 is an exploded view of a portion of a spacer structure constructed in accordance with the invention.

In assembling the spacer structure of the invention, the arrangement of the ribs may be best seen in FIG. 4. A number of the ribs 23 corresponding to the number of slots along the edges 19 of the ribs 13 are oriented with their slots opening in a direction to mate with the slots 17. Similarly, a number of the ribs 23 are arranged with their slots 25 in the opposite direction to correspond with and mate with the slots 18 along the edges 21 of the ribs 13. Thus, the ribs 23 are oriented to alternate the position of the slotted edges 27 in accordance with the alternating sequence of the slots 17 and 18 to mate in the slots on both of the longitudinal edges 19 and 21. Once the assembly is completed, the ribs are welded to each other at the mating slots, resulting in the configuration shown in FIG. 1.

Because all ribs in the "X" direction are alternately slotted in the over and under pattern described, and because the "Y" direction ribs have slots along one side but are alternately oriented, the weld shrinkage in the "X" direction is equally distributed along the top and bottom edges. No net difference in shrinkage occurs between the opposite edges 19 and 21 of the ribs 13. Shrinkage in the "Y" direction, along the ribs 23, occurs between the top and bottom surfaces of the ribs alternately. The net result is that the alternate top and bottom shrinkages compensate each other. Moreover, the contact points of the buttons 40 are maintained positioned perfectly parallel to the longitudinal axes of the fuel rods, the optimum condition. Shrinkage in all cases is typically toward the center of the spacer and rod assembly.

Figure 3:
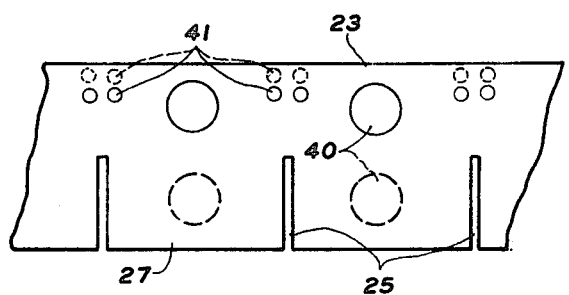
FIG. 3 is a plan view illustrating another type of rib configuration used in the invention.

For purposes of assembly, detents 41 are provided to locate and trap the slotted edges of the ribs during welding. These detents are integral protuberances on the ribs 13 and four are provided for each slot. Two of the detents project from each side of the ribs near the edge opposite the slotted edge, as may be seen in FIG. 2. Similar detents are provided on the ribs 23 as shown in FIG. 3.

The design of the invention permits fabrication of the spacer grid assembly with little or no rework required due to weld shrinkage warping. It is possible to produce spacer assemblies that meet all pitch tolerance requirements without rework and, more important, which align the buttons with a minimum of deviation. All this is accomplished with simplified assembly tooling requiring only a peripheral type envelope fixture to maintain squareness of the spacer assembly.

It may therefore be seen that the invention provides an improved spacer structure for maintaining a spaced relation between a plurality of generally parallel fuel rods within a housing in a nuclear reactor. The spacer assembly of the invention requires little or no rework, greatly reducing the costs of fabrication over typical prior art designs.

Various modifications of the invention in addition to those shown and described herein will become apparent to those skilled in the art from the foregoing description and accompanying drawings. Such modifications are intended to fall within the scope of the appended claims.

What is claimed is:

1. A nuclear reactor fuel element comprising a generally tubular support structure, a plurality of generally parallel fuel rods disposed longitudinally within said support structure and spacer structure for maintaining a spaced relation between said fuel rods, said spacer structure including a plurality of substantially parallel metallic first ribs supported by the support structure so as to extend thereacross, said first ribs each having a plurality of slots therein extending from the opposite longitudinal edges thereof in a direction perpendicular thereto, said slots being parallel with one another and spaced longitudinal along said first ribs with about half of said slots extending from each longitudinal edge, a plurality of substantially parallel metallic second ribs supported by the support structure and extending transversely of said first ribs, said second ribs each having a plurality of slots therein extending in a perpendicular direction from a single longitudinal edge thereof, said second ribs being interengaged with said first ribs at said slotted locations with about half of said slotted edges of said second ribs facing in one direction and about half facing in the opposite direction, a pair of spaced detents being provided on each surface of said ribs, aligned with each slot and located generally near the longitudinal edge opposite said slot, said detents of each pair being spaced apart just greater than the thickness of said rib, said first and second ribs being welded to each other at said locations of interengagement along said slots, said detents engaging the interengaged rib adjacent the slot and thus maintaining desired alignment of said first and second ribs during welding.

2. A fuel element according to claim 1 wherein the sequence of slotting in said first ribs is such that every other slot extends from the same longitudinal edge.

3. A fuel element according to claim 1 wherein said first ribs are arranged in said support structure disposed substantially perpendicular to said second ribs.

4. A nuclear reactor fuel element comprising a generally tubular housing for vertical disposition in a nuclear reactor, a plurality of generally parallel fuel rods disposed vertically within said housing and horizontally extending spacer structure for maintaining a spaced relation between said fuel rods, said spacer structure including a plurality of parallel metallic first ribs supported by said housing and extending thereacross, said first ribs each having a plurality of vertical slots therein extending from both the upper and lower longitudinal edges thereof, said slots being spaced longitudinally along said ribs in sequence with every other slot extending from the same longitudinal edge, a plurality of parallel metallic second ribs supported by said housing and extending transversely of said first ribs, said second ribs each having a plurality of vertical slots therein all extending from one longitudinal edge thereof, said second ribs being interengaged with said first ribs at said slotted locations with about half of said slotted edges of said second ribs facing upward and about half facing downward, said first and second ribs being welded to each other at said locations of interengagement along said slots.

5. A fuel element according to claim 4 wherein detents are provided on each of said ribs which detents engage the interengaged rib adjacent the slot and thus maintain desired alignment of said first and second ribs during welding.

6. A fuel element according to claim 4 wherein a pair of spaced detents is provided on each surface of said ribs, aligned with each slot and located generally near the longitudinal edge opposite said slot, said detents of each pair being spaced apart just greater than the thickness of said rib.

* * * * *